Figure 1:
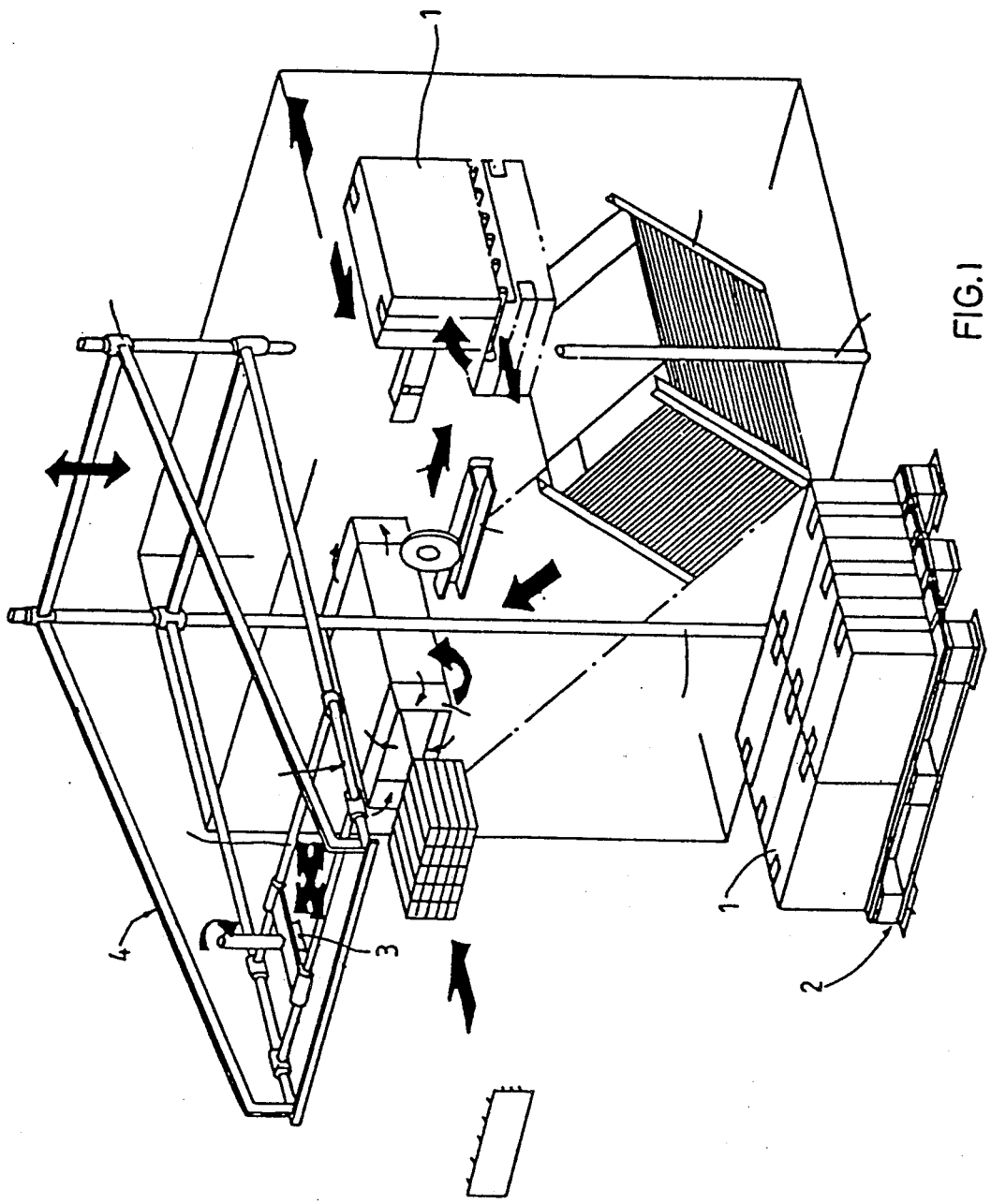

United States Patent [19]
Berger et al.

[11] Patent Number: 4,613,032
[45] Date of Patent: Sep. 23, 1986

[54] APPARATUS FOR PLACING PALLETS ON A LOADING SURFACE

[75] Inventors: Maurice Berger; Jean-Francois Bernasconi, both of Cortaillod, Switzerland

[73] Assignee: Fabriques de Tabac Reunies, S.A., Neuchatel, Switzerland

[21] Appl. No.: 750,232

[22] Filed: Jun. 28, 1985

Related U.S. Application Data

[63] Continuation of Ser. No. 530,189, Sep. 8, 1983, abandoned.

[30] Foreign Application Priority Data

Jul. 6, 1983 [EP]   European Pat. Off. ........ 83810308.3

[51] Int. Cl.⁴ ............................................. B65G 57/24
[52] U.S. Cl. .................................. 198/409; 414/101; 414/110; 414/778
[58] Field of Search ................. 414/38, 43, 46, 101, 414/110, 680, 778, 783; 198/409

[56] References Cited

U.S. PATENT DOCUMENTS

| 1,498,732 | 6/1924 | Jauch | 414/38 |
| 2,894,648 | 7/1959 | Mussett | 414/69 X |
| 2,985,323 | 5/1961 | Wilson et al. | 414/38 |
| 3,384,249 | 5/1968 | Greenberger | 414/38 |
| 4,119,214 | 10/1978 | Blom . | |

FOREIGN PATENT DOCUMENTS

| 941600 | 4/1956 | Fed. Rep. of Germany | 414/778 |
| 1038472 | 9/1958 | Fed. Rep. of Germany . | |
| 2207076 | 6/1974 | France . | |
| 581035 | 11/1977 | U.S.S.R. | 414/101 |
| 734104 | 5/1980 | U.S.S.R. | 414/101 |

Primary Examiner—Leslie J. Paperner
Attorney, Agent, or Firm—Jeffrey H. Ingerman

[57] ABSTRACT

A pallet (2) is positioned on its edge in the receiver (6) where it is restrained by the dog (9). The action of the jack (12) is such as to fold back the receiver (6) for the guidance of the pallet to the position (2'). The two jacks (14) drive the arms (8), the stops on which (16) restrain the pallet and guide it to the loading position (2"), releasing the receiver (6), which can be raised. The jacks (15) provide the means for putting the rollers (28, 29) into the conveying position.

8 Claims, 8 Drawing Figures

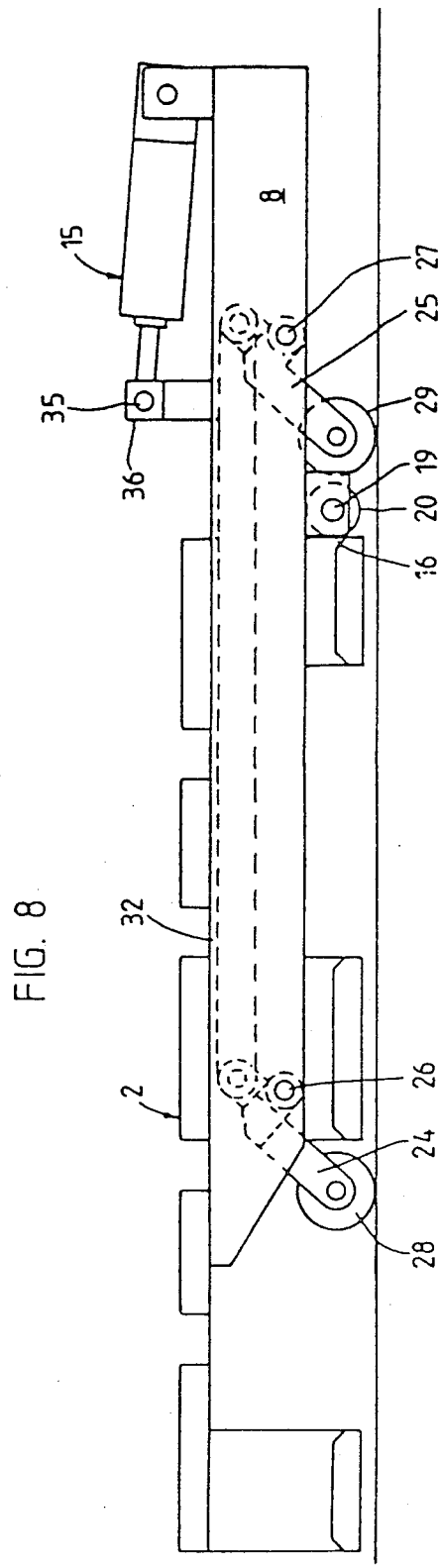

APPARATUS FOR PLACING PALLETS ON A LOADING SURFACE

This is a continuation of application Ser. No. 530,189, filed Sept. 8, 1983, entitled APPARATUS FOR PLACING PALLETS ON A LOADING SURFACE, now abandoned.

Standard pallets are used for conveying numerous objects. Also known are types of handling apparatus capable of automatically introducing to and arranging on pallets certain objects having a simple form and exhibiting uniform dimensions. For instance, European Patent Application No. 82 810144.4 describes a handling apparatus combined with a device which can place cartons of cigarettes in packing cases and then seal the latter. This handling apparatus siezes the packing cases and moves them in such a way as to form stacks on a pallet.

The purpose of this invention is to simplify—mainly by automating—the placing in position and removal of the pallets before and after loading, using a handling apparatus. Naturally the apparatus according to this invention can be combined with various automatic object distribution and conveyance installations. It can also be combined with a purely manual loading system.

Accordingly, the object of this invention is a device for placing pallets on a loading surface, characterised in that it comprises a receiver capable of tilting about a horizontal axis between a receiving position and a folded-back position, and in the receiving position being capable of supporting a pallet placed on its edge, a mobile conveyor capable of engaging with a pallet which is itself located in the receiver in its folded-back position, and drive means acting on the conveyor in such a way as to impose on it a horizontal positioning movement between a withdrawal and a loading position, releasing the pallet in the receiver during the course of this movement.

Figure 2:
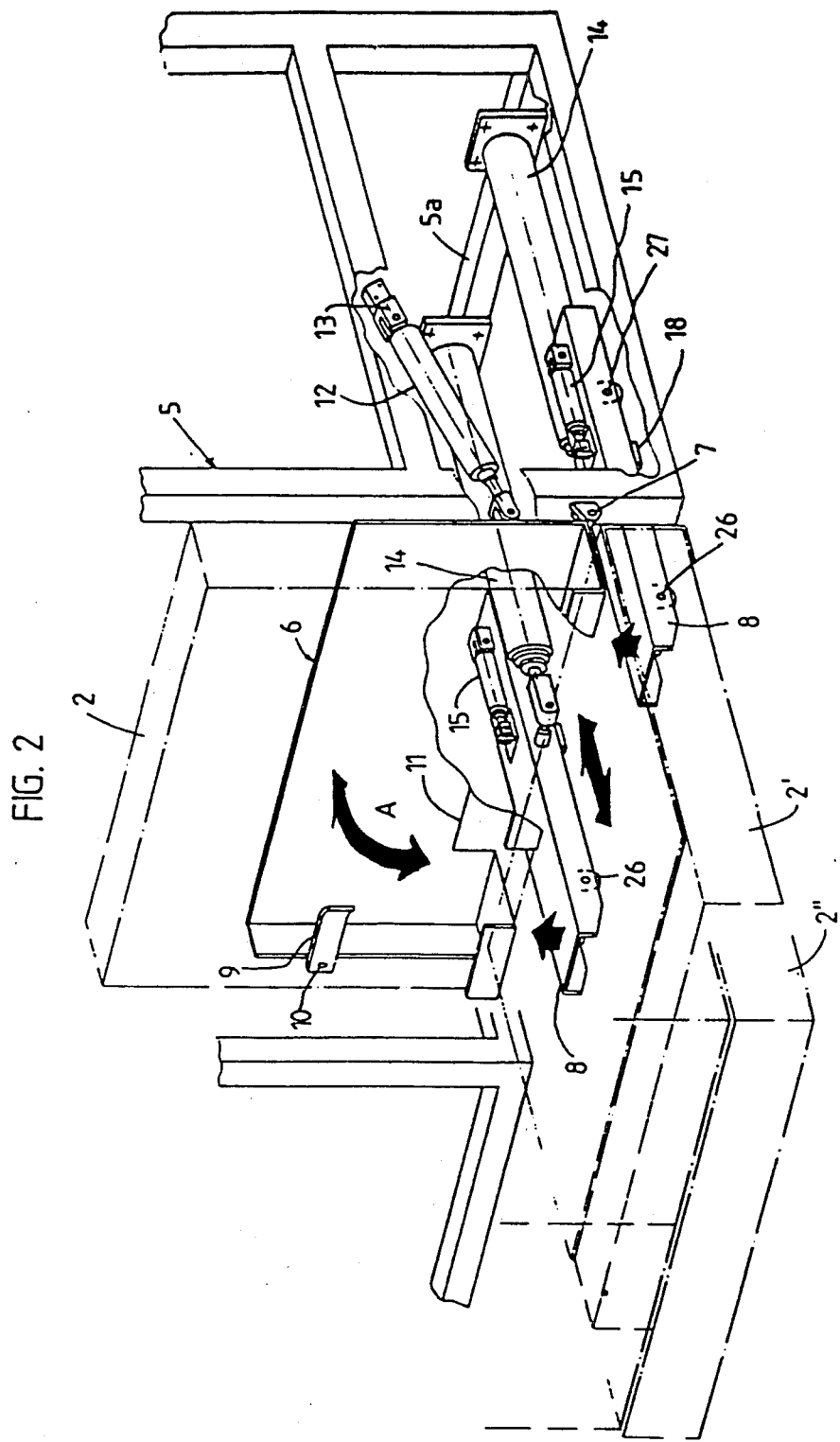
Figure 4:
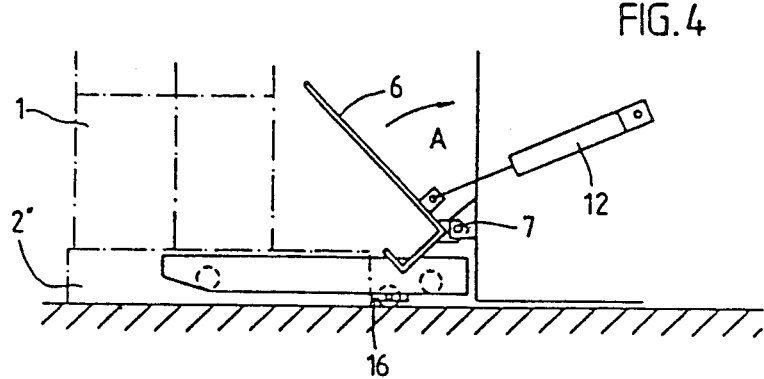
Figure 5:
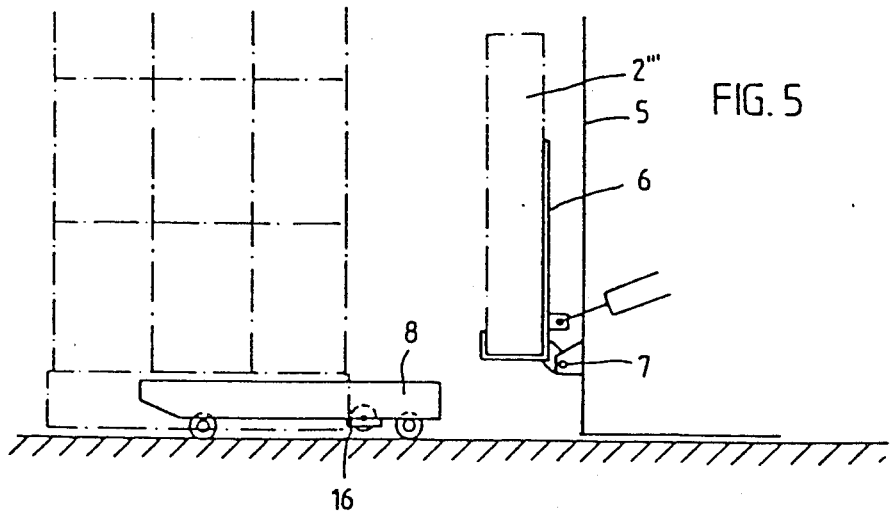
Figure 6:
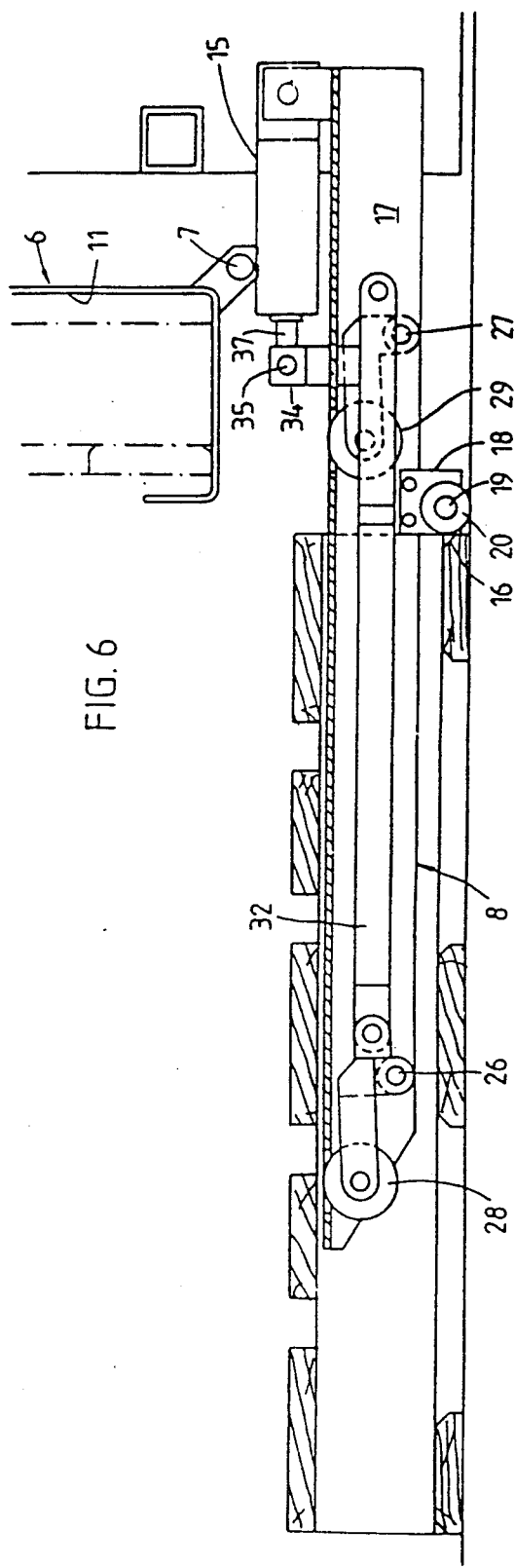
Figure 7:
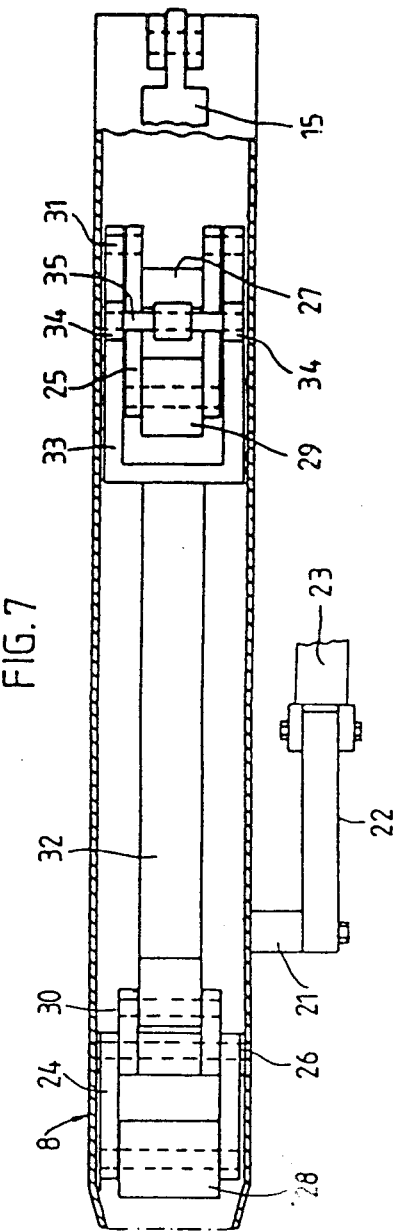

The following describes, by means of an example, a version of an apparatus according to the invention, making reference to the attached drawings, of which:

FIG. 1 is a simplified schematic perspective view of a known handling apparatus for cigarette packing cases, with which the apparatus according to the invention can be combined, FIG. 2 is a simplified schematic perspective view of the apparatus for positioning the pallets combined with the handling apparatus in FIG. 1, FIGS. 3, 4 & 5 are schematic elevation views showing the functional phases of the apparatus for positioning the pallets, FIG. 6 is a vertical sectional view of the apparatus showing a conveyor arm in the loading position, FIG. 7 is a partial sectional view of the conveyor arm shown in FIG. 6, and FIG. 8 is a partial elevation view of the conveyor arm in FIG. 6, showing this arm in its position during a subsequent movement.

Before continuing with a more detailed description of the pallet positioning apparatus, it is recalled that a cigarette handling and packing apparatus is already known which is capable of arranging the packing cases 1 in successive layers on a pallet 2 located in front of the apparatus. Once the packing cases 1 have been filled and sealed, they are seized by a gripping device 3 in the form of a suction cup mounted on a frame 4 which is capable of being displaced in height, and which is mounted on guide bars so that it can be displaced longitudinally and transversely in order to introduce the packing cases 1 to their determined locations on the pallet 2.

The apparatus which is to be described in the following is intended for the simple, rapid and accurate positioning of the pallets 2 at a predetermined loading location on the loading surface which extends in front of the handling apparatus, in order that the automatic control elements for the movement of suction cup 3 can function with reference to a fixed predetermined loading position for pallet 2. In FIG. 2 can be seen the lower part of a frame 5 which forms a support and a base both for the handling apparatus and for the device for positioning the pallets. Coupled to this frame 5 are firstly a receiver 6 pivoted to the former at two points 7 and aligned with its horizontal axis, and secondly two conveyor arms 8 positioned parallel to the floor and capable of being displaced horizontally in a direction perpendicular to the pivoting axis of the receiver 6 determined by the pivot points 7. The receiver 6 is made from sheet metal folded and bent to an L-shape to form a sliding element, the rear side of which is higher than the front side when the receiver is in the raised position as shown in FIG. 2, and the folded edge of which carries a rotating dog 9 pivoted at 10 on the front edge thereof. This sheet metal element also exhibits two symmetrical grooves 11, which as will be seen later facilitate the engagement of the conveyor arms 8. A jack 12, the cylinder of which is fixed to the frame 5 by means of a pivot 13, the actuating rod being pivoted on the rear side of the receiver 6, enables this latter to be tilted about the axis determined by the pivots 7. The arrow A shows this tilting movement of the receiver 6.

Concerning the conveyor arms 8, it can be seen from FIG. 2 that these are each moved by a jack 14, the cylinder of which is rigidly fixed to a rear bar 5a of the frame 5, and the axis of which extends parallel to the direction of displacement of the conveyor arms 8. Further, each arm 8 carries an auxiliary jack 15, the function of which will be described later.

Figure 3:
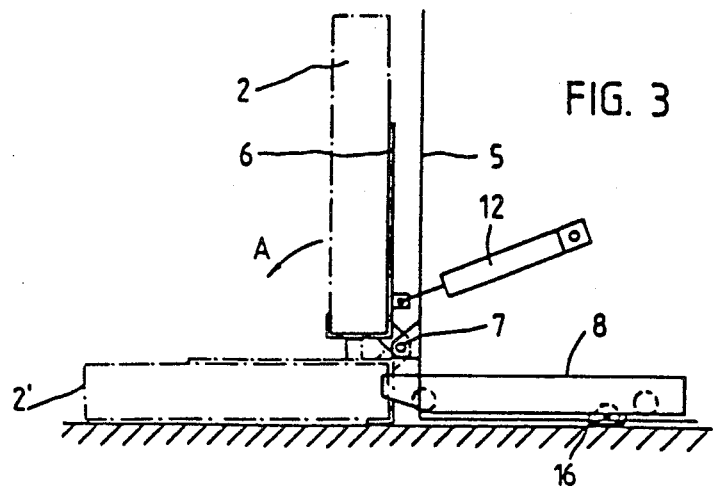

It can also be seen from FIG. 2 that the receiver 6 is shown on the one hand in its raised position in continuous lines and on the other hand by means of broken lines in its folded-back position; a pallet 2 being represented in broken lines in the receiving position, and in position 2' in the folded-back position; position 2" shows the same pallet in the loading position. These three positions are also visible in FIGS. 3, 4 and 5, where there is once again a schematic representation of frame 5, tilting jack 12, receiver 6 and one of the conveyor arms 8. In FIG. 3 the receiver 6 is in its receiving position and a pallet 2 can be positioned on its edge in this receiver in such a way that it can be restrained by the dog 9 which holds it in position vertically. During the course of the tilting of the receiver 6 illustrated by the arrow A, the pallet has been placed on the floor in position 2' in such a way that the conveyor arm 8 can be displaced forwards from its withdrawal position, its front extremity engaging with one of the grooves 11. This arm passes freely between the slats of the pallet as far as a stop which is provided on its lower surface; this stop, numbered 16, makes contact with a lower edge plate on the pallet. The forward movement of the arms 8 continues until the positioning movement is terminated, and during the final period of this movement the stop 16 drives the pallet 2 in such a way as to disengage it from the receiver 6, which can then be raised by the retraction of the jack 12 as shown in FIG. 4. The amplitude of the positioning displacement of the arm 8 is regulated by a means which will be described later and which ensures that the pallet accurately reaches a loading location designated by 2", a location at which the packing cases 1 can be stacked; for example by means of an automatic handling apparatus programmed with reference to the loading location 2".

Whilst loading is being performed as shown in FIG. 5 and when the first layer is palletised, a new pallet 2''' can be positioned on receiver 6 which has been raised and restored to its receiving position.

Finally the conveyor arm 8 is capable of performing a subsequent movement from the loading position towards a waiting position, taking with it the fully loaded pallet and releasing it at the waiting position in order that it can be returned to the withdrawal position when a new positioning operation with an empty pallet has to take place.

The structure of the conveyor arms 8 is shown in more detail in FIGS. 6, 7 and 8. FIGS. 6 and 7 show a conveyor arm in the loading position, whilst FIG. 8 shows this conveyor arm in the course of its further movement. Each conveyor arm comprises an extended body having a U-shaped profile 17. Fixed to the inner surfaces of this body 17 are two plates 18 located opposite one another, the front edges of which form the stops 16 which determine the loading position. These plates also serve to support a pivot axis 19 which is mounted between them, and on which is mounted a roller 20. The conveyor arm is further supported by a lateral shaft 21 fixed to the external face of one of the flanks of the body 17 and to which is connected a rigid bar 22 pivoted at the extremity of the actuating rod 23 of jack 14. Since the rear extremity of the cylinder of this jack 14 is rigidly fixed, as already described, to the bar 5a of frame 5, the arm 8 is totally guided in a direction perpendicular to the tilting axis of receiver 6 by means of the roller 20 and by means of the link between actuating rod 23 and the body 17. A train of extractable rollers is mounted inside the U-shaped profile of the body 17. Two forks, 24 and 25, are pivoted at axes 26 and 27, the ends of these being connected to the flanks of the body 17. These two pivoting axes 26 and 27 are located at the front extremity and in the vicinity of the rear extremity of the body 17, respectively Each of the forks 24 and 25 extends forwards and supports at its front end one of the two conveyor rollers 28 and 29, which slightly exceed the diameter of roller 20. Finally, at their rear ends, forks 24 and 25 are connected by pivot points 30 and 31 to a control bar 32. As can be seen from FIG. 7, control bar 32's front end extends between the two legs of the fork 24, whilst its rear end is in the form of another fork 33 which encloses fork 25. This fork 33 also has two vertical legs 34 which are connected by a pivot spindle 35, to which is fixed the head 36 of the actuating rod 37 of jack 15. Since the cylinder of this jack is also pivoted at its rear end to the upper edge of the body 17, it can be seen that moving the jack will in turn cause the control bar 32 to move forwards, causing the two forks 24 and 25 to perform a cantilever action about their pivoting points 30 and 31. The rollers 28 and 29 are displaced downwards during the course of this pivoting movement and have just come to rest on the floor, raising the arm 8 as shown in FIG. 8. The roller 20 then leaves the floor, and pallet 2, in which the conveyor arms 8 are engaged, is also lifted, facilitating the conveyance of the loaded pallet over a distance at least equivalent to the width of a pallet and consequently totally clearing the loading area. Retraction of the jack 15 restores the conveyor arm to the position shown in FIG. 7, such that the jack 14 can restore it to the withdrawal position, leaving the loaded pallet in the waiting position.

It should be noted that the action of the apparatus described above can be automated if the control of the conveyor arms is combined with a position detection system. For instance, it is possible to mount a control element to the conveyor arm which is capable of operating together with the contactors themselves placed at locations fixed with reference to the predetermined positions, i.e. the withdrawal position, loading position and waiting position. Since the stop 16 of necessity drives pallet 2 at the instant that they come into contact, the position of this pallet is linked to that of the conveyor arm. The effect of this is that control of the conveyor arm provides for the positioning of the pallet at the desired locations.

The engagement of a pallet placed on its edge in the receiver 6 is a very simple operation and it suffices if it is conducted until the front edge of the pallet abuts against the folded bottom of the receiver for the positioning to be certain, the pallet being restrained in its vertical position by means of the pivoted dog 9. After being folded back, it pivots forwards about its pivoting point 10 under the effect of the thrust of the pallet during the releasing procedure. When the receiver regains its vertical position, it falls under its own weight, taking up the position shown in FIG. 2, and is restrained by a support stop (not shown). Vertical storage of the empty pallets provides for economy in space and facilitates handling operations. Finally, due to the positioning method, the accuracy of subsequent operations is assured.

We claim:

1. Apparatus for placing pallets on a loading surface, said apparatus comprising:

a receiver above said surface capable of pivoting about a horizontal axis above said surface between a receiving position and a folded-back position, and in the receiving position capable of supporting a pallet placed on its edge, said receiver having a retaining means thereon for retaining said pallet on said receiver during said pivoting and for maintaining said pallet on said receiver in a withdrawal position when said receiver is in said folded-back position;

a mobile conveyer having pushing means for engaging with a pallet positioned in the withdrawal position;

drive means for displacing said pushing means in a horizontal direction perpendicular to said axis, thus imparting to said pallet a positioning displacement on said loading surface between the withdrawal position and a loading position and releasing the pallet from the receiver during the course of said displacement; and control means for detecting a predetermined length of said positioning displacement, and for stopping said drive means after having detected said length, whereby said drive means places said pallet in a precisely determined loading position on said loading surface.

2. Apparatus according to claim 1, wherein said conveyer and said control means are further arranged for successively effecting said positioning displacement and a transport displacement of said pallet from said loading position to a waiting position, the waiting position also being on said loading surface, said conveyer having means for raising said pallet above said loading surface while effecting said transport displacement.

3. Apparatus according to claim 2, wherein the conveyer comprises two parallel horizontal arms able to engage a pallet, said arms being provided with rollers and with a raising mechanism provided between said rollers and said arms, said rollers being arranged for rolling freely on said loading surface during said transport displacement.

4. Apparatus according to claim 3, wherein each of said raising mechanisms comprises an auxiliary drive means mounted on a respective one of said arms and able to actuate said raising mechanism.

5. Apparatus according to claim 4, wherein the receiver consists of an element in the form of a slide, one side of which is fitted with a pivoted dog capable of restraining a pallet positioned on the receiver, and of releasing it when subject to the thrust of the conveyor.

6. Apparatus according to claim 5, wherein the receiver exhibits grooves facilitating the engagement of the conveyor arms under the pallet when the receiver is in the folded-back position.

7. Apparatus according to claim 6, wherein each arm carries a stop which is capable of restraining the pallet during the positioning displacement.

8. Apparatus according to claim 3, further comprising and same having means for supporting said receiver, and wherein said drive means comprises a pair of jacks, the actuating rods of which are each linked to one of the conveyer arms, and the cylinders of which are connected to the base.

* * * * *

UNITED STATES PATENT AND TRADEMARK OFFICE
CERTIFICATE OF CORRECTION

PATENT NO. : 4,613,032

DATED : September 23, 1986

INVENTOR(S) : Maurice Berger et al.

It is certified that error appears in the above-identified patent and that said Letters Patent is hereby corrected as shown below:

Column 1, line 17, "siezes" should be -- seizes --;

line 55, after "partial" should be inserted -- horizontal --.

Signed and Sealed this

Eighth Day of December, 1987

Attest:

DONALD J. QUIGG

*Attesting Officer*     *Commissioner of Patents and Trademarks*